United States Patent

Kahr et al.

Patent Number: 5,892,649
Date of Patent: *Apr. 6, 1999

[54] PROCESS FOR CONTROLLING A MOVEMENT OF AN ARMATURE OF AN ELECTROMAGNETIC SWITCHING ELEMENT

[75] Inventors: Viktor Kahr, Milan, Italy; Traugott Degler, Korntal; Hubert Greif, Markgroeningen, both of Germany

[73] Assignee: Robert Bosch GmbH, Stuttgart, Germany

[*] Notice: This patent issued on a continued prosecution application filed under 37 CFR 1.53(d), and is subject to the twenty year patent term provisions of 35 U.S.C. 154(a)(2).

[21] Appl. No.: 802,320

[22] Filed: Feb. 18, 1997

[30] Foreign Application Priority Data

Feb. 24, 1996 [DE] Germany .................. 196 07 073.2

[51] Int. Cl.$^6$ ................................ H01H 47/04
[52] U.S. Cl. .......................... 361/154; 361/152
[58] Field of Search ........................ 361/152–156, 361/194

[56] References Cited

U.S. PATENT DOCUMENTS

| 5,245,501 | 9/1993 | Locher et al. | 361/154 |
| 5,381,297 | 1/1995 | Weber | 361/154 |

FOREIGN PATENT DOCUMENTS

| 130081 | 1/1978 | German Dem. Rep. | 361/194 |
| 38 43 138 | 6/1990 | Germany . | |

Primary Examiner—Fritz Fleming
Attorney, Agent, or Firm—Kenyon & Kenyon

[57] ABSTRACT

A process and a device for controlling a movement of an armature of an electromagnetic switching element having an exciter coil. A first setpoint for the current can be defined after a first time. A second setpoint for the current can be defined after a second time. The second setpoint is smaller than the first setpoint. The second time also occurs before a third time at which the armature has reached its end position.

6 Claims, 4 Drawing Sheets

Fig. 2a
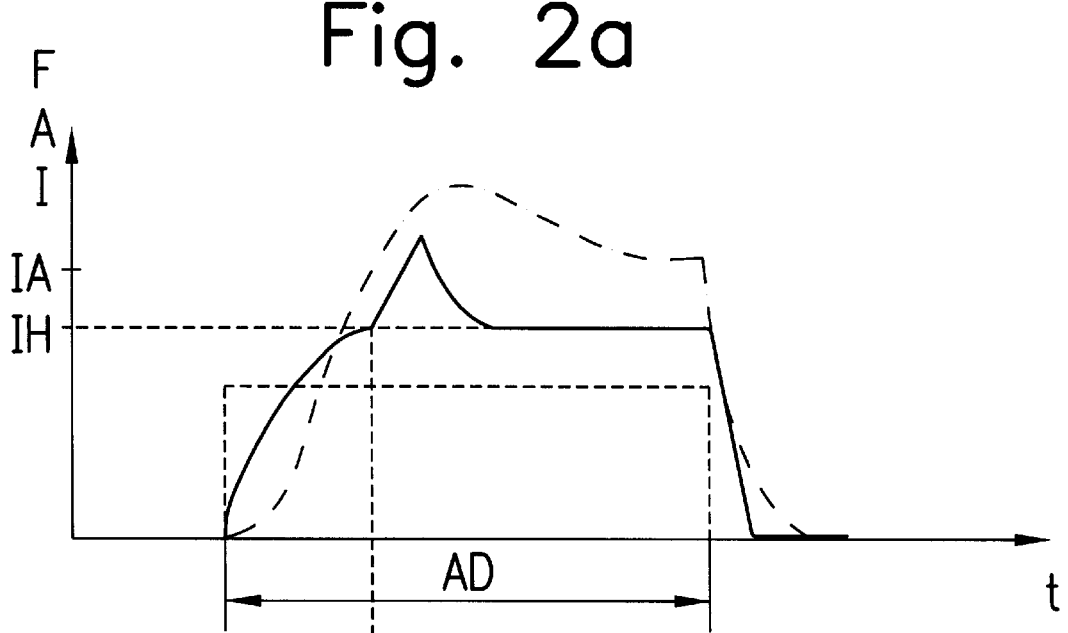
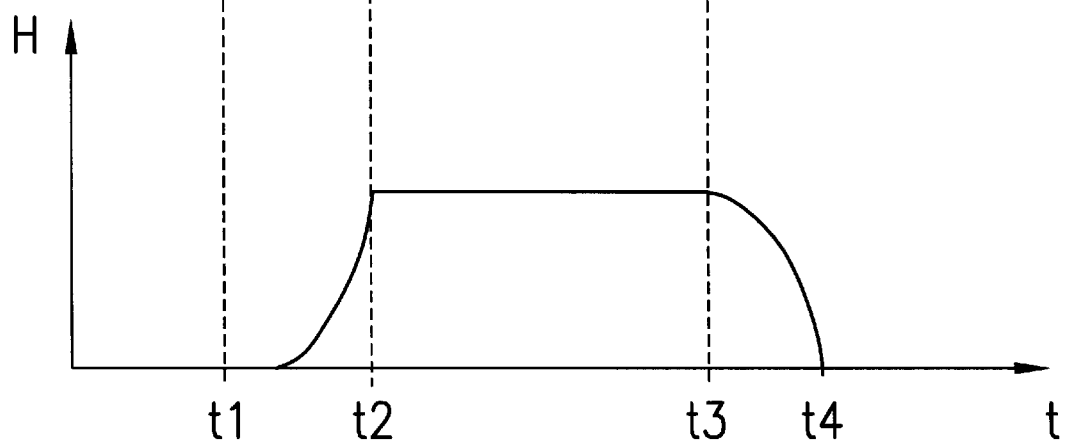
Fig. 2b

PROCESS FOR CONTROLLING A MOVEMENT OF AN ARMATURE OF AN ELECTROMAGNETIC SWITCHING ELEMENT

FIELD OF THE INVENTION

The present invention relates to a process and a device for controlling a movement of an armature of an electromagnetic switching element.

BACKGROUND INFORMATION

German Patent Application No. 38 43 138 (U.S. Pat. No. 5,245,501) describes a process for controlling the movement of an armature of an electromagnetic switching element having an exciter coil. At the start of triggering, the exciter coil receives a boosted current which is higher than the current that is required to keep the armature in its position. When the armature reaches its new position, the triggering current drops back to a low current level. This change does not take place until the armature has reached its new end position. The current characteristics are analyzed to detect when the armature stops.

Magnetic circuit design requirements vary with regard to the desired dynamics of the solenoid valve needle and how well the current characteristic can be analyzed.

SUMMARY OF THE INVENTION

The object of the present invention is to achieve high dynamics for the armature and a current characteristic that can be thoroughly analyzed in a process and device for controlling a movement of an armature of an electromagnetic switching element.

The procedure according to the present invention yields good armature dynamics and a voltage characteristic that can be thoroughly analyzed.

BRIEF DESCRIPTION OF THE DRAWINGS

FIGS. 2a and 2b show various signals plotted over time generated using conventional methods and devices.

DETAILED DESCRIPTION

Processes and devices according to the present invention can be used for controlling a movement of an armature of any electromagnetic switching element. They are preferably used to control the movement of a valve needle of a solenoid valve that determines the amount of fuel to be injected in an internal combustion engine, especially a diesel combustion engine. However, it is also possible to control the movement of an armature of a solenoid valve that is used, e.g., in an antilock brake control system.

Figure 1:
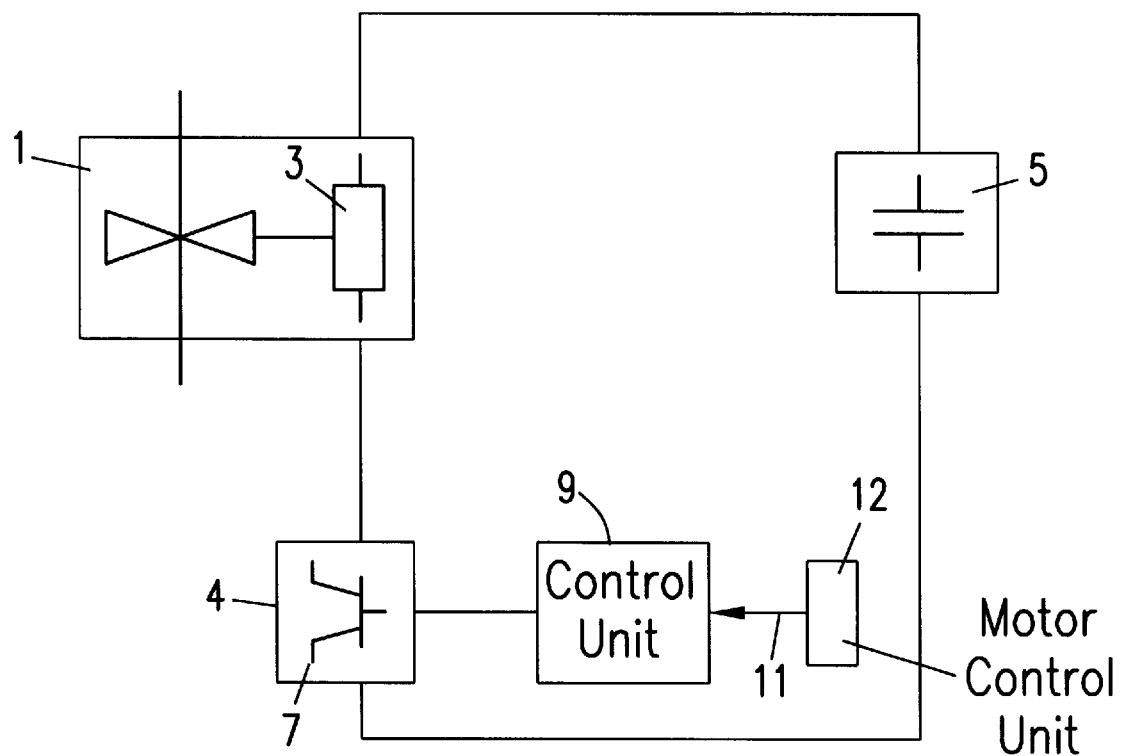
FIG. 1 shows a block schematic of the device according to the present invention.

FIG. 1 illustrates, for example, a solenoid valve 1 that is used to control a diesel combustion engine (not shown here). Exciter coil 3 of the solenoid valve is connected in series with a voltage source 5 and with at least one controllable switching device such as a transistor that is triggered by control unit 9 as a function of a control signal 11. Control signal 11 is supplied by a motor control unit 12.

FIGS. 2a and 2b show plots of various signals that occur with conventional devices and methods. FIG. 2a shows plots of the current I flowing through the solenoid valve, triggering signal A and the magnetic force F. Current I is represented by a solid line, triggering signal A by a dotted line and magnetic force F with a dash-dot line.

FIG. 2b shows stroke H of the solenoid valve needle or the armature plotted over the same units of time. Triggering starts at time t1, which means that triggering signal A assumes a higher level. The current rise starts at this time. Accordingly, there is also an increase in magnetic force F. After a brief time lag, the valve needle begins to move.

At time t2, the valve needle reaches its new end position. As a result, the inductance of the coil changes, which in turn means that the increase in current I changes. Current I continues to increase until reaching current level IA which corresponds to the starting current.

With a conventional device, the current is reduced to a low level after time t2. This low current level is known as the holding current IH. This current is selected so it is just sufficient to keep the magnetic armature in its new position.

Magnetic force F increases significantly after time t1. Magnetic force F drops slowly again when the current has reached the holding current.

At time t3, triggering signal A is stopped. As a result, current I and magnetic force F drop back to zero again. At the same time, valve needle travel again drops back to zero. At time t4 the solenoid valve closes again.

The period between time t1 and t2 is known as the operating interval, which is the time that elapses between the triggering and the response of the solenoid valve.

The time between t3 and t4 is known as the closing time accordingly. This is the time that elapses between triggering and reaching the new end position.

The closing time and the ON time are also known as the switching time.

The period of time between time t1 and time t3 is the triggering period AD.

The on time and the closing time of the solenoid valve depend greatly ON the operating parameters of the injection pump in a diesel combustion engine, especially with a high-pressure injection. The battery voltage, operating temperature and pump speed have the greatest influence. Since solenoid valves directly control the high pressure and thus the amount of fuel injected, a change in ON time has a great influence on the amount of fuel injected. For this reason, the ON time at the respective operating point must be corrected to achieve accuracy in injection.

To determine the ON time, a plot of current over time t at a constant voltage should be analyzed. When the armature reaches its new end position, which is the case at time t2, the inductance of the coil changes. A change in inductance at a constant voltage results in a change in the current characteristic. A kink in the current characteristic at switching time t2 can be detected by analyzing the current characteristic. At a constant current, a variable inductance results in a change in the voltage characteristic which has a kink in the curve at switching time t2. Again, this can be detected by analyzing the voltage characteristic.

The magnetic circuit of the coil must be designed to yield a significant change in inductance and for this to have a significant effect on the voltage and/or current characteristic. An optimum design in the sense of a favorable voltage and/or current characteristic results in negative effects on the dynamics of the solenoid valve needle. This, in turn, causes the ON time to be prolonged.

One of the disadvantages of the embodiment shown in FIGS. 2a and 2b is that when the needle comes to rest against the valve seat at time t2, the magnetic force F has not reached a steady state. The magnetic force F has a definite phase lag with respect to the current. Consequently, the closing time depends on triggering time. This dependence is then reflected in the pump flow characteristics and makes it especially difficult to adjust the pump.

Another disadvantage is that the magnetic circuit reaches saturation before the needle reaches the valve seat, so the magnetic circuit loses its magnetizing inductance property. This is especially the case at a high operating voltage.

To prevent these disadvantages, a free current rise be altered shortly before the needle reaches the valve seat and that the current can be regulated at holding current IH.

Figure 3A:
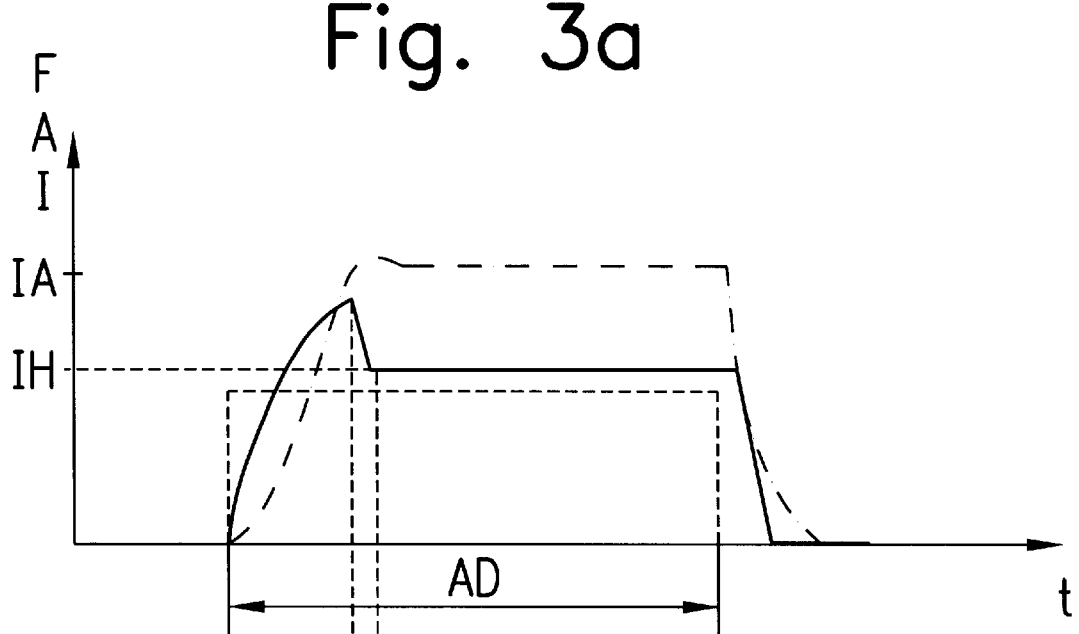
FIGS. 3a and 3b show the corresponding signals in a process according to the present invention.
Figure 3B:
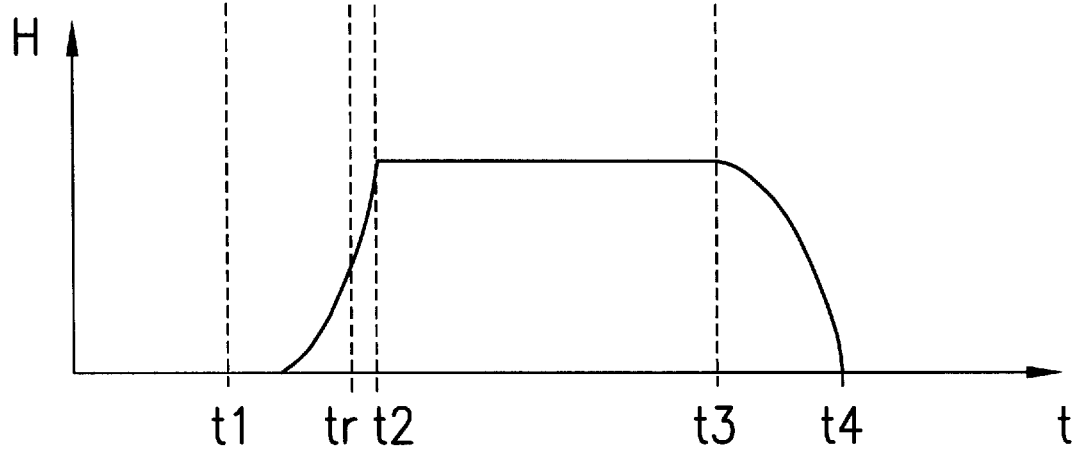

FIGS. 3a and 3b show plots of the various signals generated using the process according to the present invention. In contrast with the embodiment illustrated in FIGS. 2a and 2b, the setpoint for current I shown in FIGS. 3a and 3b is reduced to holding current IH at time tr, which is immediately before time t2. As a result, the current reaches the holding current before time t2 when the solenoid valve needle strikes the seat.

Furthermore, magnetic force F has already assumed a constant value by this time. Magnetic force F reaches a constant value immediately after time tr and maintaining the constant value until time t3. From time t1 until time tr, magnetic force F increases, assuming a constant value from time t2 until time t3, and then it drops back to zero by time t4.

The current increases from time t1 until time tr and then drops down to the level of holding current IH. After time t3, the current drops back to zero.

The switch to holding current level IH is accomplished by means of a value recorded in a table for the time tr. Time tr occurs the shortest possible length of time before the needle strikes the valve seat, i.e., shortly before time t2. The interval between time tr and time t2 is adjusted according to the present invention such that at time t2 the current has reached level IH and magnetic force F has reached a steady state.

An anticipated value for the ON time t2 is entered in the chart. To determine the actual ON time, the curve of voltage U is analyzed. If the current is regulated to holding current IH, this results in a change in voltage when the valve needle strikes the valve seat. The change in voltage on the solenoid valve during the time the needle is striking the valve seat (due to the sudden absence of magnetizing inductance) is very high and is substantially independent of the magnetic circuit design.

Figure 4:
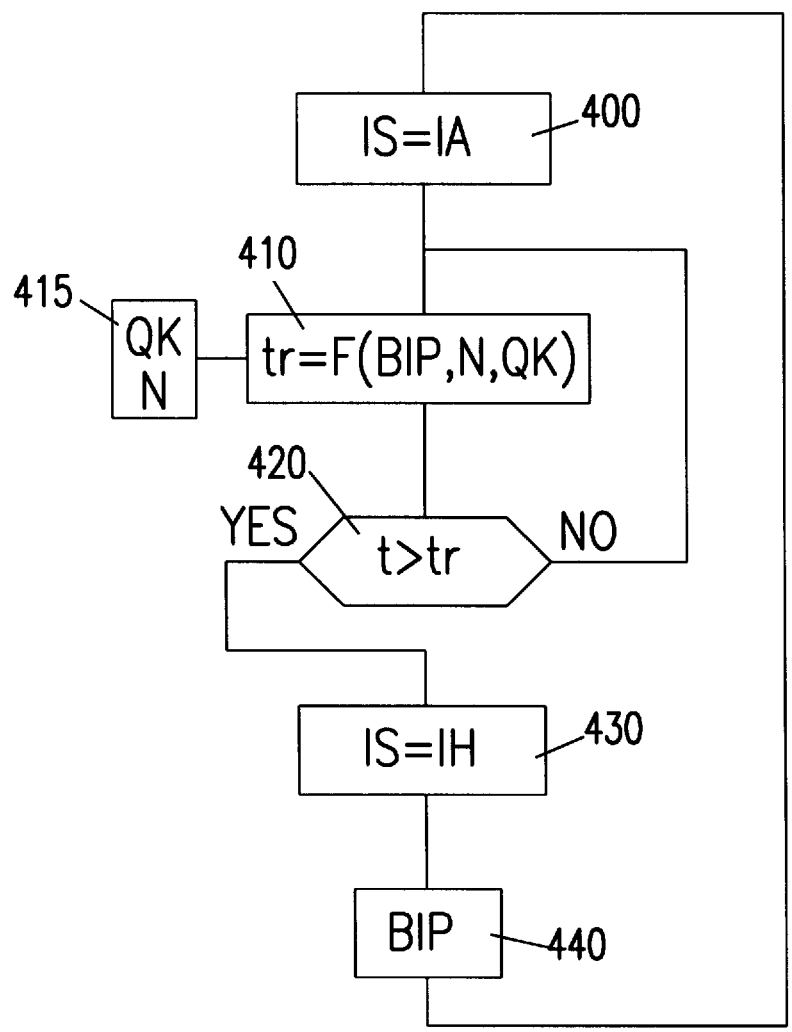
FIG. 4 shows a flow chart of the process according to the present invention.

FIG. 4 shows the process according to the present invention. At the start of injection at time t1, setpoint IS corresponding to pickup current IA is established for the current in the first step 400. Then in step 410, time tr is determined. Time tr is preferably calculated from a chart as a function of various operating parameters that are determined in step 415. Fuel volume QK and rpm N are preferably used as operating parameters. In addition, it is advantageous if the switching time BIP, which was determined in the preceding measurement, is included in the calculation of time tr.

In an exemplary embodiment, time tr is derived from switching time BIP, which corresponds to time t2, using the preceding measurements. Then time tr is obtained by reducing time t2 by a certain interval. The above-mentioned interval takes into account, among other things, the scattering in switching time t2 from one measurement to the next, and it is optionally selected such that the current will have definitely reached holding level IH by switching time t2.

Subsequent inquiry 420 checks on whether time tr has already been reached. If this is not the case, step 420 or step 410 is performed again by recalculating time tr if necessary. Once-time tr has been reached, a new IH level is defined for setpoint IS of the current in step 430 using the device shown in FIG. 1. At the same time in step 440, switching time BIP is calculated by analyzing the voltage drop at the solenoid valve.

It is further advantageous with an embodiment according to the present invention that the magnetic circuit can be designed so as to yield favorable solenoid valve switching times. Regulating the current to reach the holding current IH before the needle actually strikes the valve seat has an insignificant influence on switching time. Regulation to the holding current starts when the solenoid valve needle has already reached a high speed and the magnetic force has increased significantly due to the reduction in air gap.

Since the magnetic force is already constant by the time the valve seat has been reached, this yields a constant cut-out characteristic even with a variable triggering time. This means that triggering time has no effect on cut-out time.

In addition, changes in switching times due to external influences can also be taken into account in the charts.

What is claimed is:

1. A method for controlling a movement of an armature of an electromagnetic switching element, the armature including an exciter coil, the method comprising the steps of:

applying at least one of a preselected current and a preselected voltage to the exciter coil, a coil current flowing through the exciter coil as a function of the at least one of the preselected current and the preselected voltage for moving the armature, a first current setpoint for the coil current being set after a first time;

setting a second current setpoint of the coil current after a second time, the second current setpoint being smaller than the first current setpoint, the armature reaching an end position at a third time, the coil current reaching the second current setpoint one of i) at the third time, and ii) before the third time, the second time occurring before the third time; and maintaining the coil current at the second current setpoint after the third time to hold the armature in the end position.

2. The method according to claim 1, wherein the second time is selected so that the coil current reaches the second current setpoint one of before the third time and at the third time.

3. The method according to claim 1, wherein the second time is selected so that a magnetic force reaches a steady state at the third time.

4. The method according to claim 3, wherein the electromagnetic switching element controls a volume of fuel to be injected in an internal combustion engine, wherein the second time is preselected as a function of at least one of the volume of fuel to be injected, revolutions-per-minute of the internal combustion engine, and the third time.

5. The method according to claim 1, wherein the second time is provided in a chart.

6. A device for controlling a movement of an armature of an electromagnetic switching element, comprising:

an exciter coil, the armature being moved as a function of a coil current flowing through the exciter coil when at least one of a current and a voltage is applied to the exciter coil, wherein a first setpoint of the coil current is set after a first time; and at least one apparatus setting a second setpoint of the coil current lower than the first setpoint after a second time, the armature reaching an end position at a third time, the second time occurring before the third time, the coil current reaching the second setpoint one of i) at the third time, and ii) before the third time, the at least one apparatus maintaining the coil current at the second setpoint after the third time to hold the armature in the end position.

* * * * *